P. E. WALDMANN.
BOLT FASTENING MEANS.
APPLICATION FILED JAN. 20, 1920.
1,356,843.
Patented Oct. 26, 1920.
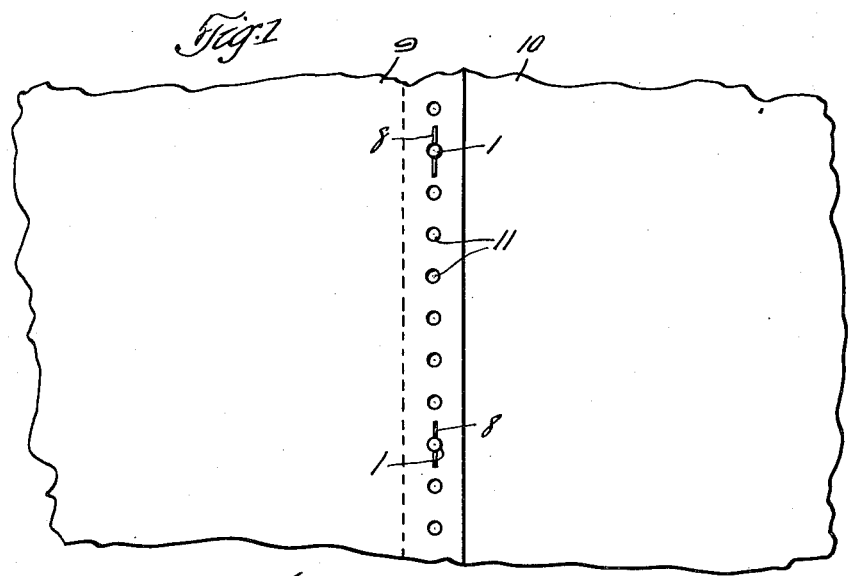
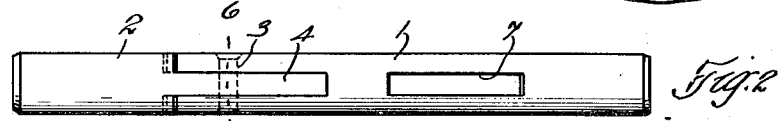
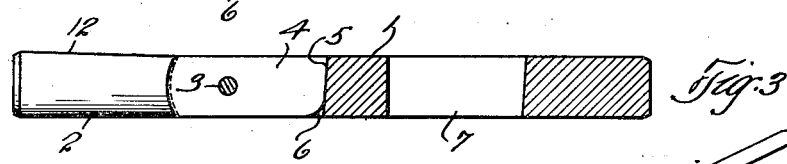
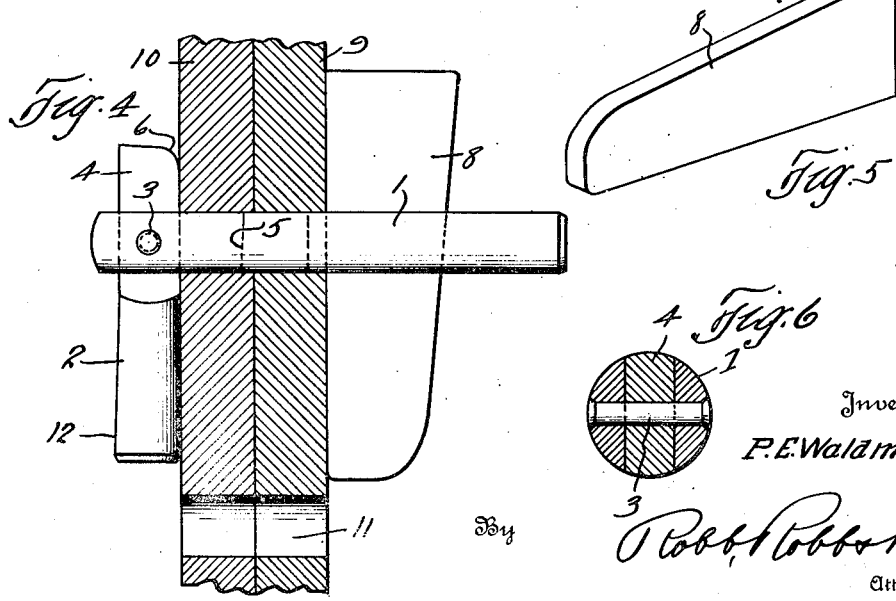
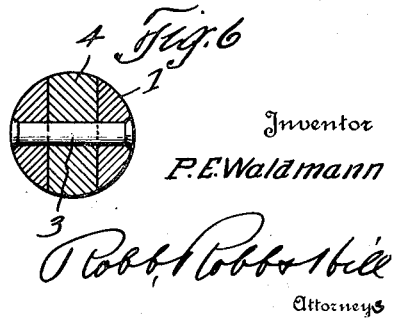
Inventor
P. E. Waldmann

UNITED STATES PATENT OFFICE.

PAUL E. WALDMANN, OF BALTIMORE, MARYLAND.

BOLT-FASTENING MEANS.

1,356,843.      Specification of Letters Patent.      Patented Oct. 26, 1920.

Application filed January 20, 1920. Serial No. 352,819.

*To all whom it may concern:*

Be it known that I, PAUL E. WALDMANN, a citizen of the United States, residing at Baltimore, in the State of Maryland, have invented certain new and useful Improvements in Bolt-Fastening Means, of which the following is a specification.

The present invention relates to improvements in fastening means or threadless bolts designed particularly for fastening together two or more parts, one side of which is usually inaccessible to the other. An object in view is to provide a simple bolt-like device for use, for example, in the attachment of plates or armor to the sides of a ship or connecting together the units of large tanks and the like, which will eliminate the necessity of extra labor and the waste of time usually involved where the conventional bolt and nut are employed.

A further object in view is to provide such a device as above referred to with means for drawing the parts to be connected tightly together.

A still further object resides in the provision of such a construction that it may be quickly applied and displaced at will.

With these and other objects in view, the invention consists in certain novel combinations and arrangements of the parts as will more fully appear as the description proceeds, the novel feature thereof being pointed out in the appended claim.

For a full understanding of the invention, reference is to be had to the following description and accompanying drawings, in which:—

Figure 1 is a fragmentary view in elevation of two metal parts held together by the embodiment of this invention.

Fig. 2 is a top plan view of the bolt portion of the device.

Fig. 3 is a longitudinal sectional view of the body portion of the fastener, its drop section being shown in elevation.

Fig. 4 is a sectional view through two parts adapted to be connected and having the fastening means of this invention applied in operative position thereon.

Fig. 5 is a perspective view of the wedge member used with this invention.

Fig. 6 is a sectional view on the line 6—6 of Fig. 2.

Corresponding and like parts are referred to in the following description and indicated in all the views of the drawings by the same reference characters.

As hereinbefore premised the purpose of this invention is to substitute a quickly attachable device for the conventional bolt in those places where the use of the latter would require a man to hold the head of the bolt on the inside or at least one side, while the nut was being screwed upon the bolt from the other side. It should be understood, however, that the fastening means of this invention may be utilized in any place where it is desired to connect two or more parts together, and the article may be made in different lengths and sizes depending upon the use to which it is to be adapted. The fastening means comprises a bolt-like member consisting of the main body part 1 which is bifurcated at one end to receive the extremity of the drop section 2 which is pivoted in the bifurcation as at 3. The drop section 2 is provided with an extension 4 which is adapted to coact with the inner end of the bifurcation or the shoulder 5 more strictly speaking to hold the said drop section in alined position. The extremity at one corner however is rounded as at 6 and the shoulder 5 so inclined that when the bolt is reversed the section 2 will drop into a position at an angle to the main body portion, as shown in Fig. 4. The section 1 is provided with a transverse slot 7 relatively distant from the end opposite the drop section into which a wedge 8 is adapted to be inserted, this constituting the detailed construction of the device.

In use, when it is desired to apply the device so as to hold two plates or members together, as shown in Figs. 1 and 4, and designated 9 and 10, these members being provided with openings 11 adapted to register, the bolt part comprising the sections 1 and 2 is introduced into the openings a sufficient distance to permit the end of the extension 4 to pass the inner side of the plates. Having in view the weighted end of the drop section 2, the latter will immediately assume a position at substantially right angles to the main body part 1, thus constituting a head or cross piece in the nature of a head for the bolt member. The wedge 8 is now inserted through the opening 7 and driven home, this causing the two parts to be drawn tightly together and to be held in this position until permanent fastenings or rivets are inserted into other openings 11 and fixed therein. This application of the bolt fastening means is capable of being quickly carried out, and the displacement of said means is equally quickly accomplished by displacing the wedge 8 and shoving the bolt member through to the inside. Subsequently the member pushed through to the inside may be picked up at pleasure and the device used over and over again for the purposes specified.

One of the features of the device, however, of importance is the construction of the drop member 2 so that it may be removed from the exterior whenever it is desired to do this. For this purpose the end or side of the drop section, as indicated at 12 is extended or enlarged, so that the greater mass of metal will lie at this side of the longitudinal axis of the drop section. By turning the bolt member around so that the drop section will extend upwardly, the reverse of the position shown in Fig. 4, and moving the bolt member inwardly slightly the drop section will drop into its alined position with respect to the main part 1 enabling the bolt member to be retracted. This is all of great advantage where it is desired to use the member again without necessitating the delay in waiting for it to be gathered as above described, and also of great advantage when the fastening means would otherwise be lost because of inability to obtain access to the side of the parts to which it is dropped in carrying out the detachment as first specified.

Having thus described the invention, what I claim as new and desire to secure by Letters Patent, is:—

A fastening device of the class described, comprising a bolt member bifurcated at one end, a drop section pivoted in said bifurcated end having an extension engageable with the bolt member to hold it in alinement therewith when disposed in one position, said section being constructed to gravitate into a position at an angle to the bolt member when disposed in a reverse position, the bolt member having a transverse slot therethrough spaced from the opposite end to that having the drop section sufficient to provide a finger hold for manipulating the bolt member, and a wedge adapted to be inserted into the slot to effect drawing action.

In testimony whereof I affix my signature.

PAUL E. WALDMANN.